United States Patent [19]

Weiss

[11] Patent Number: 5,446,278
[45] Date of Patent: Aug. 29, 1995

[54] FIBER OPTIC SENSOR EMPLOYING SUCCESSIVELY DESTROYED COUPLED POINTS OR REFLECTORS FOR DETECTING SHOCK WAVE SPEED AND DAMAGE LOCATION

[75] Inventor: Jonathan D. Weiss, Albuquerque, N. Mex.

[73] Assignee: The United States of America as represented by the United States Department of Energy, Washington, D.C.

[21] Appl. No.: 172,304

[22] Filed: Dec. 23, 1993

[51] Int. Cl.⁶ .................................. H01J 5/16
[52] U.S. Cl. ................................... 250/227.15
[58] Field of Search .............. 250/227.15, 227.12, 250/227.14; 73/655, 653

[56] References Cited

U.S. PATENT DOCUMENTS

| | | | |
|---|---|---|---|
| 4,408,495 | 10/1983 | Couch et al. | 73/655 |
| 4,443,700 | 4/1984 | Macedo et al. | 250/227 |
| 4,534,222 | 8/1985 | Finch et al. | 73/653 |
| 4,589,285 | 5/1986 | Savit | 73/655 |
| 4,636,638 | 1/1987 | Huang et al. | 250/231 R |
| 4,775,216 | 10/1988 | Layton | 350/96.29 |
| 4,808,814 | 2/1989 | Hofer et al. | 250/227 |
| 4,843,234 | 6/1989 | Berthold et al. | 250/227 |
| 4,901,584 | 2/1990 | Brunner et al. | 73/862.04 |
| 4,936,649 | 6/1990 | Lymer et al. | 350/96.29 |
| 4,950,883 | 8/1990 | Glenn | 250/227.14 |
| 5,028,775 | 7/1991 | Furukawa et al. | 250/227.15 |
| 5,038,620 | 8/1991 | Rogers, Jr. et al. | 73/861.38 |
| 5,107,129 | 4/1992 | Lombrozo | 250/554 |
| 5,142,141 | 8/1992 | Talat et al. | 250/227.15 |
| 5,250,802 | 10/1993 | Runner | 250/227.15 |

Primary Examiner—David C. Nelms
Assistant Examiner—Steven L. Nichols
Attorney, Agent, or Firm—Luis M. Ortiz; James H. Chafin; William R. Moser

[57] ABSTRACT

A shock velocity and damage location sensor providing a means of measuring shock speed and damage location. The sensor consists of a long series of time-of-arrival "points" constructed with fiber optics. The fiber optic sensor apparatus measures shock velocity as the fiber sensor is progressively crushed as a shock wave proceeds in a direction along the fiber. The light received by a receiving means changes as time-of-arrival points are destroyed as the sensor is disturbed by the shock. The sensor may comprise a transmitting fiber bent into a series of loops and fused to a receiving fiber at various places, time-of-arrival points, along the receiving fibers length. At the "points" of contact, where a portion of the light leaves the transmitting fiber and enters the receiving fiber, the loops would be required to allow the light to travel backwards through the receiving fiber toward a receiving means. The sensor may also comprise a single optical fiber wherein the time-of-arrival points are comprised of reflection planes distributed along the fibers length. In this configuration, as the shock front proceeds along the fiber it destroys one reflector after another. The output received by a receiving means from this sensor may be a series of downward steps produced as the shock wave destroys one time-of-arrival point after another, or a nonsequential pattern of steps in the event time-of-arrival points are destroyed at any point along the sensor.

11 Claims, 3 Drawing Sheets

1

FIBER OPTIC SENSOR EMPLOYING SUCCESSIVELY DESTROYED COUPLED POINTS OR REFLECTORS FOR DETECTING SHOCK WAVE SPEED AND DAMAGE LOCATION

The U.S. Government has rights in this invention pursuant to contract No. DE-ACO4-76DP00789 between the United States Department of Energy and American Telephone and Telegraph Company.

FIELD OF THE INVENTION

The present invention relates generally to fiber optics used as sensors to detect the velocity and location of shock waves, detonation fronts, or damage locations on a structure. More specifically, the invention is directed to a sensor providing a consistent, fiber-optic means of measuring shock speed and location using a pair or a single optical. fiber as the sensing transducer. The invention is adaptable to applications involving detonation detection and location, as well as location of structural cracks, breaks or strains.

BACKGROUND OF THE INVENTION

The detection of shock wave velocity and damage location provides important information to researchers or technicians concerned with underground nuclear and explosives testing, earthquake detection, and structural failure diagnostics. Electrical sensing systems are susceptible to electromagnetic interference which tend to affect the accuracy of typical electronic measurement systems. Optical detection systems employing bulk optics, as opposed to optical fibers, often suffer from loss of alignment and cleanliness of their components, particularly in a field environment.

U.S. Pat. Nos. 5,107,129 (Lombrazo) and 5,142,141 (Talet et al.) disclose fibers that are broken as part of their detection process. Talet involves the detection of cracks while Lombrazo detects burn rate, both using optical fibers. The primary embodiments of Talet's multiple-loop arrangement is used. The breakage of one loop after another indicates the arrival of the burn front or the crack at the position of the loop. Both disclosures implicitly assume that each loop will be broken in an equivalent position. Although both disclosures differ in terms of proposed function, they are essentially structurally identical.

U.S. Pat. No. 4,843,234 (Berthold et al.) involves the measurement of the length of a single fiber using Optical Time Domain Reflectometry, which is a well known technique for determining the round trip travel time of a light pulse down the length of an optical fiber. The shortest length change detectable depends on the pulse repetition rate and the pulse length based on reflection.

U.S. Pat. No. 4,936,649 (Lymer et al.) mentions interdigitated optical fibers and "volume backscattering" as a means of determining the location of structural damage.

Copending patent application, Ser. No. 08/083,223, provides a continuous fiber optic means of measuring shock location wherein an optical fiber is doped with impurities and, depending on the strength of the cable surrounding the fiber, the device could be designed with virtually any threshold crush pressure. Light is transmitted into the sensor cable via a light source and received by a receiving means at a different wavelength because of the induced fluorescence from the impurities. As the cable is crushed or destroyed along its length the receiving means provides the changes in light volume within the cable. One could also have considerable latitude in choosing the length over which this device is sensitive to shock pressure.

As with the copending application, the optical nature of the present sensor invention causes it to be immune to electromagnetic interference and incapable of transmitting electrical signals that may contain sensitive information to the outside world. The optical nature of the sensor also reduces inaccuracies in the system that could be caused by various sources of electromagnetic interference. These features are in contrast to those of the leading existing devices, such as the SLIFER (Shorted Location Indication by Frequency of Electrical Resonance) and CORRTEX (Continuous Reflective Radius Time Experiment) coaxial cable type transducer devices whose outputs are discrete and electrical, and whose minimum crush strength is known to produce misleading measurements at low shock pressures. The present invention also overcomes the shortcomings of current fiber-optic devices that suffer from poor spatial resolution and bulk-optic devices that suffer from alignment problems.

Thus, there is an existing need for a simple fiber optic damage location and shock velocity sensor that overcomes the shortcomings of the current art electrical and optical detectors.

SUMMARY OF THE INVENTION

It is therefore an objective of the present invention to fulfill the need for a shock wave velocity and damage location sensor that overcomes the shortcomings of the current art electrical and optical detectors by providing a simpler fiber-optic sensing device. In view of the above-described needs, the present invention provides consistent measurement of shock wave velocity and damage location while avoiding electrical interference and the use of multiplicious or bulky components.

To achieve the foregoing and other objects and in accordance with the purpose of the invention, as embodied and broadly described herein, there is provided a fiber optic shock wave velocity and damage position sensor comprising a long series of time-of-arrival "points" constructed along at least one optical fiber. Data are provided to a receiving means from the optical fiber as the time-of-arrival points are progressively crushed by the shock wave proceeding in a direction along the fiber. In one embodiment the transmitting fiber would be bent into a series of loops and fused to the receiving fiber at various places along its length in a manner similar to that used in the manufacture of the now commonplace multimode fiber optic couplers. At the "points" of contact, where a portion of the light leaves the transmitting fiber and enters the receiving fiber, loops would be required so that the light would be traveling backwards, toward the receiver. The output from this sensor can be a series of downward steps produced as a shock wave destroys one coupling point after the other. The sensor may also produce a single drop in output based on sensor damage in an isolated area, or the output may be a nonsequential series of steps if the fiber is destroyed at several random locations along the sensor.

In accordance with another aspect of the invention, the time-of-arrival points are comprised of reflection planes distributed along the length of a single optical fiber. The totality of the reflections within the fiber determines the signal received by the receiving means.

As a shock front proceeds, it destroys one reflector after another, thereby producing various output responses similar to that produced with the first embodiment.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the present invention and, together with the description, serve to explain the operation, features, and advantages of the invention.

DETAIL DESCRIPTION OF THE PREFERRED EMBODIMENTS

Figure 1:
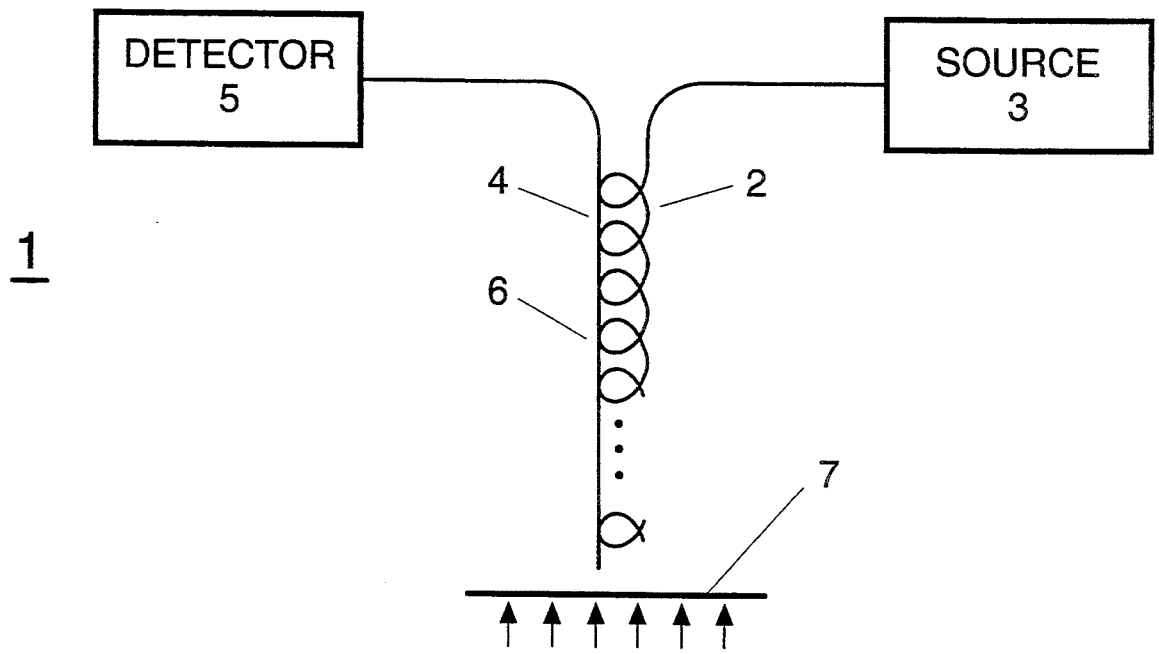
FIG. 1 is a illustration of the one embodiment of the basic sensor configuration with arrows indicating the direction of the potential shock front.
Figure 2:
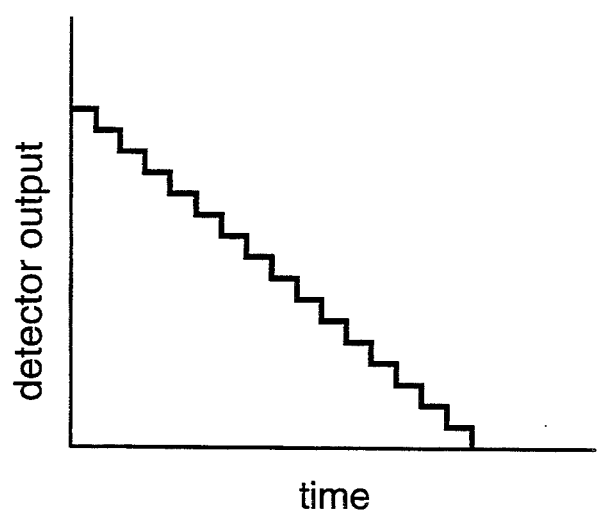
FIG. 2 is an illustration of a potential output from the sensor as recorded by the detector.

Referring to FIG. 1, therein is illustrated a first embodiment of the optical fiber shock velocity sensor 1. The shock position sensor 1 consists of two optical fibers; a multiple-looped fiber 2 emerging from a optical fiber light source 3 and a straight fiber 4 that leads to a detector 5. Time-of-arrival points 6 are formed along the straight fiber 4 with the multi-looped fiber 2. The fibers, 2 and 4, are fused to each other at each loop in a manner similar to that used in the construction of multimode fiber-optic couplers. In this way, a small fraction ($\approx 1\%$) of the light from the source fiber would be coupled to the detector fiber 4 at each fusion point 6, or time-of-arrival points 6, resulting in a detector output that monotonically increases with the number of fusion points. As the shock progresses in the direction indicated 7, each fusion point 6 would be successively destroyed and the ideal detector output would drop in a staircase fashion as illustrated in FIG. 2. Because the geometry of manufacture and deployment would be known a priori, and the transition times would have been measured, the position of the shock front could be determined at any instant to within one fusion length. These fusion points need not be equally spaced. If greater spatial resolution were needed in certain regions than in others, they could be more densely packed where required.

During manufacture of the sensor, the detector output would be monitored as time-of-arrival points are added so that adjustments can be made empirically in the degree of coupling at any such point to produce the desired upward staircase response. In operation, the destruction of the sensor could simply "run" the detector output down the stairs; however, the output may also appear nonsequential, or as single drop in output, in the event the sensor is destroyed at a single location or at multiple random locations along its length.

A selection of equipment for the optical light source 3 and the optical detector 5 is not critical. Any optical source having a wavelength within the transmission limits of the fiber and having radiation that can be conveniently coupled into the fiber, can be used to illuminate the sensor. A light-emitting diode (LED) which by design is suited to optical fibers and emits radiation in the 820 micrometer range may be used as the source 3 for the sensor. The optical detector 5 must be calibrated and is preferably linear in the optical power incident upon it. It may be implemented with a calibrated photometer; more specifically, a P-I-N diode may be used as the detector. Calibration of the sensor is accomplished by determining the variation of transmitted light amplitude as a function of the number of remaining points-of-contact along the fiber.

Figure 3:
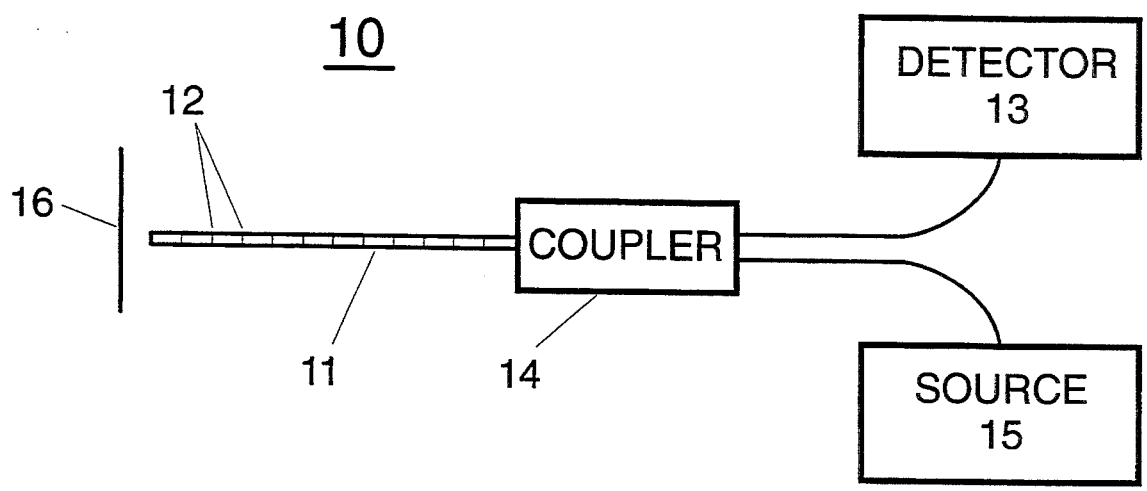
FIG. 3 is an illustration of a second embodiment of the basic sensor configuration.

Referring to FIG. 3, another embodiment of the invention, an embedded grating sensor 10, is illustrated. The basic configuration of the device consists an optical fiber 11 which contains reflection planes 12 as time-of-arrival points that are distributed in a known manner along the fiber's 11 length. Ignoring all other reflections within the system, the totality of these reflectors determine the return signal received by a detector means 13 coupled 14 to the fiber 11. As the shock front 16 proceeds, it destroys one reflector after another, thereby producing a staircase response similar to that illustrated in FIG. 2. A light source 15 is also coupled 14 to the single fiber 11 to provide the light signal needed by the reflectors 12 in order to produce a signal to the detector 13. The second embodiment may also produce a single drop in output or a nonsequential drop in output, similar to the first embodiment, in the event that the sensor is destroyed at a single or at random locations along its length.

Figure 4:
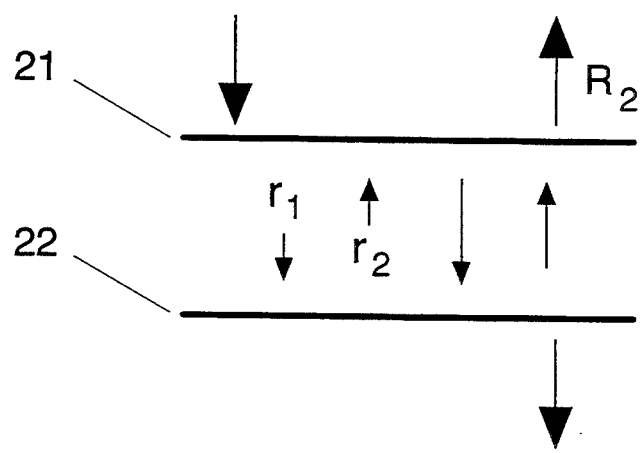
FIG. 4 is an illustration of reflective planes as used in the second embodiment of the invention.

Referring to FIG. 4, the first two reflective planes are considered with a distance between them much greater than the coherence length of the light source, having "elemental" intensity reflectiveness $r_1$ and $r_2$. Then by adding up the intensities of all the internal reflections, the overall reflectivity, $R_2$, of the composite is shown to be:

$$R_2 = r_1 + r_2(1-r_1)^2/(1-r_1 r_2).$$

When a third reflection plane is added having elemental reflectivity $r_3$, the new composite reflectivity becomes:

$$R_3 = R_2 + r_3(1-R_2)^2/(1-R_2 r_3).$$

Generalizing to a composite having n reflection planes:

$$R_n = R_{n-1} + r_n(1-R_{n-1})^2/(1-R_{n-1} R_n).$$

For a constant r, the multilayer reflectivity may asymptotically approach unity as the number of surfaces approaches infinity, implying a step size that approaches zero. If it is desired that the step size be a constant K, then $R_m = Km$, and $r_m$ must vary. After solving for $R_m$:

$$R_{m+1} = K/[(1-Rm)^2 + K^2 m].$$

It should be noted that the above provided analysis can be applied to both embodiments of the invention because the points-of-contact in the first embodiment serve the same function as internal reflection planes.

Figure 5:
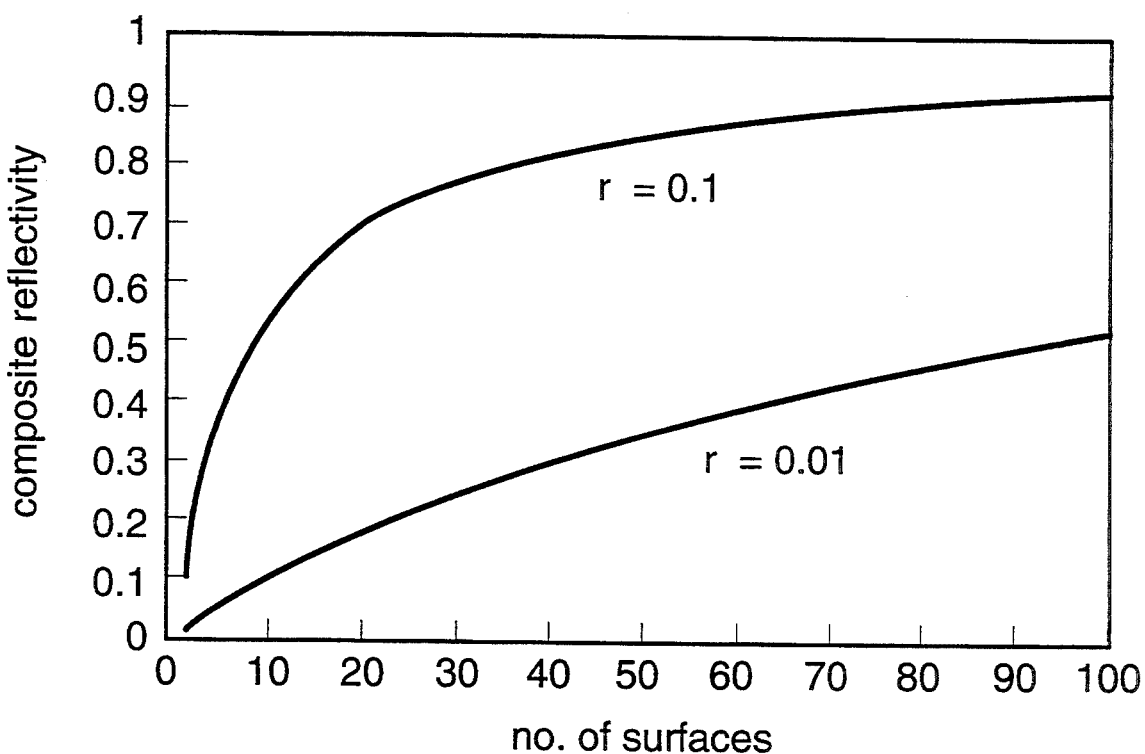
FIG. 5 is a graphical illustration of composite reflectivity vs. the number of reflective planes used in the second embodiment.
Figure 6:
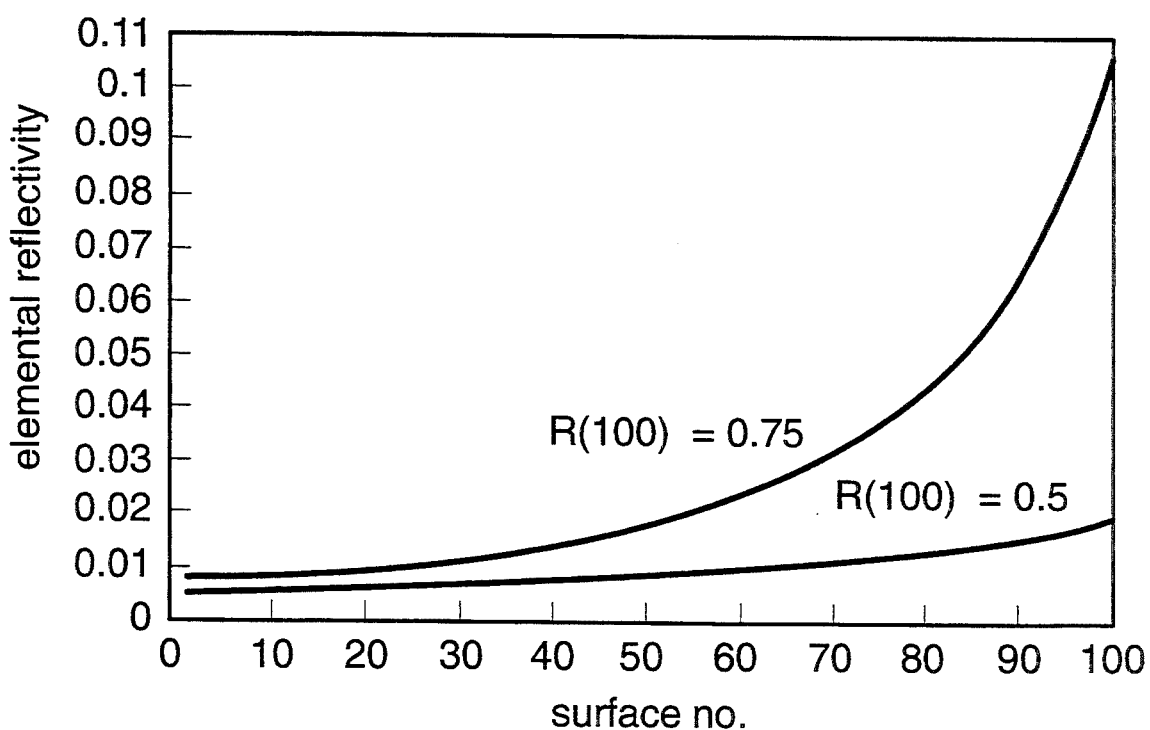
FIG. 6 is a graphical illustration of elemental reflectivity of a given surface vs. the number of surfaces to produce a constant step size.

Various cases of interest have been calculated based on these equations. FIG. 5 contains plots of the composite reflectivity vs. number of surfaces for a 100-surface sensor having all $r_m=0.1$ and all $r_m=0.01$. The step size is not constant, but diminishes as the number of surfaces increases. A trade-off exists between range and sensitivity, where sensitivity is defined as the step size. FIG. 6 consists of plots of the elemental reflectivity of a given surface vs. surface number for a 100-surface composite reflector whose composite reflectivity is 0.5 or 0.75 before exposure to a shock wave. Thus, $R_{100}=0.5$ and $K=0.005$, $R_{100}=0.75$ and $K=0.0075$. A substantial composite reflectivity can be produced, as in the case of $R_{100}=0.5$, without requiring the elemental reflectiveness to exceed 2%.

It is desirable that the reflection surfaces be periodic refractive-index distributions (or gratings) that have been "written" or embedded in the fiber. As in the case of any stratified medium, their reflectivity will depend upon the depth and spatial period of the modulation and the number of periods. The process of embedding these gratings would not involve any breaks in the fiber, but would be the same as that used by the United Technologies Research Corporation (UTRC) to create distributed fiber-optics sensors for "smart skin" applications.

When a germanium-doped optical fiber is exposed to ultraviolet radiation of about 240 nanometers, a photochemical change takes place that induces a corresponding change in the glass' refractive index. A change as high as 0.006 has been reported, but $5\times 10-4$ is typical. This refractive index change can be made periodic by introducing the ultraviolet radiation into the fiber as a standing-wave pattern. The spatial period that optimizes reflection is $\lambda/2n$, where $\lambda$ is the vacuum wavelength of the light reflected off the grating and n is the refractive index of the fiber. A 1% reflection can be achieved with a grating length of about 1500 such periods. This length is 0.4 millimeters for 800-nm light. Although not microscopic in thickness, it is still much thinner than the separation of at least several centimeters between gratings. It is thus thin enough to be considered a "surface" in the present context. Once an overall composite reflectivity is decided upon, a given step size could be achieved by monitoring the reflected light during the fiber's exposure to the ultra-violet radiation. Exposure of that portion of the fiber will cease when the desired step size is achieved. The process would then be repeated down the line.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. Therefore, it is intended that the specification and the examples be considered as exemplary only, with the true scope and spirit of the invention being indicated in the following claims.

What is claimed is:

1. An optical sensor for detecting damage position and shock wave velocity, comprising:
   an optical fiber comprising a series of time-of-arrival points further comprising reflection planes distributed along the length of a single along the length of a single optical fiber located at predetermined intervals along said optical fiber wherein each of said time-of-arrival points contribute to the overall light signal received by a light detector means;
   a light source means coupled to said optical fiber; and
   a light detector means coupled to said optical fiber wherein said light detector means receives light signals transmitted through said optical fiber from said light source means;
   wherein said optical fiber provides a unique light signal to said detector means based on the number of time-of-arrival points remaining on said optical fiber at the time of measurement.

2. The optical sensor of claim 1 wherein the intensity level of light received by said detector means decreases in downward steps as a shock wave destroys one of said time-of-arrival points after another as said fiber optic cables are disturbed as a shock wave proceeds along the fiber.

3. The optical sensor of claim 1 wherein said light received by said detector means changes in intensity correlated to damage to at least one of said time-of-arrival points.

4. The sensor of claim 1 wherein the totality of reflections from said reflection planes within the fiber determines the signal received by said detector means.

5. The optical sensor of claim 4 wherein destruction of said reflection planes by an approaching shock wave produces a varying light response to said detector based on light signal quality produced by said reflection planes remaining along said cable.

6. The optical sensor of claim 4 wherein destruction of at least one of said reflection planes produces a change in light intensity received by said detector based on light signal quality produced by said reflection planes remaining along said cable.

7. An optical sensor for detecting damage and shock wave velocity, comprising:
   a multi-looped optical fiber coupled to an optical fiber light source; and
   a single optical fiber coupled to a light receiver/detector means;
   wherein said multi-looped optical fiber is fuse coupled to said single optical fiber at each loop of said multi-looped optical fiber and each successive coupling is destroyed by the shock wave, indicative of the shock wave velocity.

8. The optical sensor of claim 7 wherein said multi-looped optical fiber and said single optical fiber are fused together at said each loop by a plurality of coupling means.

9. An optical sensor for detecting damage and shock wave velocity, comprising:
   an optical fiber containing a plurality of reflection planes said fiber coupled to a light source means and a light detector means, and said reflection planes are distributed along said fiber's length, wherein the totality of said reflection planes determine the return signal received by a detector means.

10. The optical sensor of claim 9 wherein said reflection planes comprise reflective surfaces with periodic refractive-index gratings embedded in said fiber wherein reflectivity of each of said grating will depend upon the depth and spatial period of modulation and number of periods.

11. The optical sensor of claim 10 wherein said optical fiber contains a plurality of surface composite reflective planes whose composite reflectivity is 0.5 to 0.75, wherein elemental reflectiveness by said reflection planes is less than 2 percent.

* * * * *